(12) United States Patent
Hioki et al.

(10) Patent No.: US 11,229,976 B2
(45) Date of Patent: Jan. 25, 2022

(54) WELDING METHOD

(71) Applicant: TOYOTA JIDOSHA KABUSHIKI KAISHA, Toyota (JP)

(72) Inventors: Toru Hioki, Miyoshi (JP); Atsushi Kawakita, Miyoshi (JP); Shuhei Ogura, Nagakute (JP); Ryosuke Kawai, Okazaki (JP); Takashi Goto, Toyota (JP); Kazuho Takishita, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 16/364,628

(22) Filed: Mar. 26, 2019

(65) Prior Publication Data

US 2019/0308271 A1 Oct. 10, 2019

(30) Foreign Application Priority Data

Apr. 5, 2018 (JP) .............................. JP2018-072901

(51) Int. Cl.
*B23K 26/244* (2014.01)
*B23K 26/082* (2014.01)

(52) U.S. Cl.
CPC .......... *B23K 26/244* (2015.10); *B23K 26/082* (2015.10)

(58) Field of Classification Search
CPC .. B23K 26/242; B23K 26/244; B23K 26/082; B23K 26/0884; B23K 26/32
USPC ........................... 219/121.14, 121.46, 121.63
See application file for complete search history.

(56) References Cited

U.S. PATENT DOCUMENTS

| | | | |
|---|---|---|---|
| 5,603,853 A | * | 2/1997 | Mombo-Caristan ........................ B23K 15/006 219/121.64 |
| 2005/0109740 A1 | * | 5/2005 | Becker .................. B23K 26/22 219/121.64 |
| 2010/0326967 A1 | * | 12/2010 | Freitag ................. B23K 26/211 219/121.64 |
| 2017/0008124 A1 | * | 1/2017 | Fujimoto ................. C21D 1/09 |

FOREIGN PATENT DOCUMENTS

| | | | |
|---|---|---|---|
| JP | 8-90266 A | | 4/1996 |
| JP | 2001-71286 A | | 3/2001 |
| JP | 2005-334914 A | | 12/2005 |
| JP | 2008-178905 A | * | 1/2007 |
| JP | 2014-113616 A | | 6/2014 |
| JP | 2015-199110 A | | 11/2015 |
| WO | 9626807 A1 | | 9/1996 |

OTHER PUBLICATIONS

Partial Translation of Communication dated Apr. 12, 2021 from the China National Intellectual Property Administration in Application No. 201910248757.5.

(Continued)

*Primary Examiner* — Thien S Tran
(74) *Attorney, Agent, or Firm* — Sughrue Mion, PLLC

(57) ABSTRACT

Partial welding of partially joining together two metal plates by melting at least one area inside a joining region of the metal plates is performed. After a lapse of a predetermined time from completion of the partial welding, main welding of joining together the metal plates by melting the joining region entirely is performed.

9 Claims, 10 Drawing Sheets

(56) References Cited

OTHER PUBLICATIONS

Zhang, Jianyong, "Seam Welding Process Analysis of Metro Stainless Steel Car-body Corrugated Sheet", Technology and Market, May 31, 2016, pp. 66-70 (4 pages total), English Abstract.
Wang, Di et al., "Research on Three-dimensional Technology of Metal Parts Based on Laminated Shim Connection", Essay Collection of 17th National Academic Conference on Non-traditional Machining (vol. Two), Nov. 30, 2017, pp. 323-328 (6 total pages).

* cited by examiner

WELDING METHOD

INCORPORATION BY REFERENCE

The disclosure of Japanese Patent Application No. 2018-072901 filed on Apr. 5, 2018 including the specification, drawings and abstract is incorporated herein by reference in its entirety.

BACKGROUND

1. Technical Field

The present disclosure relates to a welding method of welding together a plurality of overlapping metal plates along a preset joining region.

2. Description of Related Art

Lap fillet welding is conventionally known as a technique of joining (welding) together a plurality of metal plates. Japanese Patent Application Publication No. 2015-199110 discloses a method relating to lap fillet welding of two metal plates, in which, when there is a gap between the metal plates (hereinafter also referred to as a plate gap), the amount of heat input into each of the metal plates by laser beam irradiation is adjusted so as to allow molten metal to bridge the gap along the metal plates and join together the metal plates.

SUMMARY

However, when there is a large gap between metal plates (plate gap), bridging the gap along the metal plates with molten metal requires a large amount of molten metal. Thus, welding conditions for producing the amount of molten metal required to bridge the gap with molten metal along the metal plates need to be appropriately selected according to the plate gap, which may make the selection of welding conditions troublesome or the configuration of a welding device complicated.

The present disclosure provides a welding method by which metal plates can be easily joined together even when there is a large gap between the metal plates.

The subject of an aspect of the present disclosure is a welding method of welding together a plurality of overlapping metal plates along a preset joining region. This welding method includes: performing partial welding of partially joining together the metal plates by melting at least one area inside the joining region of the metal plates; and after a lapse of a predetermined time from completion of the partial welding, performing main welding of joining together the metal plates by melting the joining region entirely.

In the welding method according to this aspect of the present disclosure, first, the partial welding of partially joining together the metal plates by melting at least one area inside the joining region of the metal plates is performed. Here, a gap between the metal plates (plate gap) becomes smaller as molten metal contracts during solidification. Thus, the plate gap along the joining region becomes smaller. After a lapse of a predetermined time from completion of the partial welding, the main welding is performed. In the main welding, the metal plates are joined together by melting the entire joining region. Here, the plate gap along the joining region has become smaller as a result of the partial welding, so that even when the amount of molten metal in the main welding is relatively small, this molten metal enters the plate gap to a degree sufficient to bridge the gap along the metal plates, forming a good joint between the metal plates. Since the plate gap along the joining region has thus become smaller before the start of the main welding in this aspect of the present disclosure, it is easy to select the welding conditions for producing the amount of molten metal required to bridge the gap with molten metal along the metal plates. Thus, it is possible to avoid making the selection of welding conditions troublesome and allow for easy welding operation.

The joining region may extend in a direction along a weld line that is a border between the metal plates. In the partial welding, each of a plurality of welding areas located at predetermined intervals in the direction along the weld line may be melted to partially join together the metal plates.

According to this configuration, upon completion of the partial welding, the gap between the metal plates (plate gap) has become smaller along substantially the entire metal plates in the direction along the weld line that is the border between the metal plates. Thus, in the main welding, the metal plates are welded with an even amount of molten metal along substantially the entire joining region, so that even joining strength along substantially the entire joining region can be secured.

In the partial welding, the welding areas located on the weld line may be welded sequentially from a welding area located on an outer side to a welding area located on an inner side.

The number of the welding areas in the partial welding may be set to such a number that, when areas located at equal intervals in the direction along the weld line are specified as welding areas, an interval between two adjacent welding areas is 10 mm in the direction along the weld line. Here, "10 mm" means not only exactly 10 mm but also approximately 10 mm based on technical common sense.

A weld length at each welding area in the partial welding step may be set to 3 mm in the direction along the weld line. Here, "3 mm" means not only exactly 3 mm but also approximately 3 mm based on technical common sense.

A welding time interval that is time interval from a completion of laser beam irradiation of one welding area until a start of laser beam irradiation of a next welding area in the partial welding step may be set to 0.2 seconds. Here, "0.2 seconds" means not only exactly 0.2 seconds but also approximately 0.2 seconds based on technical common sense.

The metal plates may be an upper plate and a lower plate overlapping each other in a vertical direction, and a plate thickness of the upper plate may be set to be smaller than a plate thickness of the lower plate.

The parameters such as the welding order, the number of welding points, the weld length, the welding time interval, and the plate thickness of the upper plate influence the change in the plate gap between the metal plates occurring during execution of the partial welding step. Setting these parameters as described above can sufficiently reduce the plate gap along the joining region before the start of the main welding step while reducing the time taken for the partial welding step to a required minimum amount.

The metal plates may be an upper plate and a lower plate overlapping each other in a vertical direction. In the main welding, when lap fillet welding may be performed on a lap fillet portion of the upper plate and the lower plate under irradiation of a laser beam from above, an irradiation position of the laser beam is moved along a locus which circularly or elliptically circles around a locus center so as to cross the weld line that is a border between the metal plates such that the locus center is moved in a direction along the weld line. A moving direction of the irradiation position of the laser beam which conform to the locus may be set such that the laser beam is first applied to the upper plate and then to the lower plate when the laser beam passes through an unmelted zone of the upper plate and the lower plate, the unmelted zone being located on a downstream of a range through which the laser beam has already passed in the direction along the weld line.

According to this configuration, while the upper plate is irradiated with the laser beam in the main welding (lap fillet welding), the metal material of the upper plate is melted at this irradiation position of the laser beam to bridge the gap between the upper plate and the lower plate. In this case, the heat of the laser beam is transferred not only to the upper plate but also to the lower plate, so that a good weld is formed between the upper plate and the lower plate at this irradiation position of the laser beam. Since the heat of the laser beam is transferred to both the upper plate and the lower plate, at this point, a region of the upper plate around the irradiation position of the laser beam has a relatively small amount of heat input and the metal material in this region is in a state of being not sufficiently melted. Thereafter, the irradiation position of the laser beam moving along the path passes through the lower plate and reaches the upper plate again. As a result, the metal material in the aforementioned region of the upper plate (the region around the position at which the upper plate and the lower plate have already been welded together) that has not been sufficiently melted is fully melted under laser beam irradiation, forming a good weld between the upper plate and the lower plate also at this irradiation position of the laser beam.

Thus, when the irradiation position of the laser beam moving along the locus which circularly or elliptically circles around the locus center reaches the upper plate again, the laser beam at this irradiation position in the upper plate melts a region that has not been sufficiently melted until then. This means that the laser beam is not emitted toward a region that has been fully melted. It is therefore possible to avoid a situation such as where molten metal is blown away under the pressure of a keyhole as a laser beam is emitted toward a region that has been fully melted. Thus, a sufficient thickness of a welded area (a region where the metal material has melted and then solidified) (a sufficient throat thickness of a bead) can be secured, and thereby sufficient joining strength (joint strength) at the welded area can be secured.

The welding order in the partial welding may be such that the welding areas located on the weld line are welded sequentially from a welding area located on an outer side to a welding area located on an inner side, and then a portion between a welding area located farthest on the outer side and a welding area located adjacent to that welding area is welded.

At the point when the welding areas located on the weld line have been welded sequentially from the welding area located on the outer side to the welding area located on the inner side, the plate gap tends to be larger at an outer region than at an inner region on the weld line. However, according to this configuration, the plate gap can be reduced at the portion between the welding area located farthest on the outer side and the welding area located on the inner side of and adjacent to that welding area, and thereby the plate gap can be reduced evenly along the entire welding region of the metal plates. As a result, even when the amount of molten metal in the main welding step is even smaller, this molten metal enters the plate gap to a degree sufficient to bridge the gap along the metal plates, forming a good joint between the metal plates.

In the present disclosure, the partial welding of partially joining together a plurality of metal plates by melting at least one area within a joining region of the metal plates is performed, and then the main welding of joining together the metal plates by melting the entire joining region after a lapse of a predetermined time is performed. Accordingly, the gap between the metal plates (plate gap) can be reduced as molten metal contracts during solidification in the partial welding. Thus, the plate gap along the joining region can be reduced before the start of the main welding, which makes it easy to select the welding conditions for producing the amount of molten metal required to bridge the gap along the metal plates with molten metal, so that making the selection troublesome can be avoided.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

An embodiment of the present disclosure will be described below based on the drawings. In this embodiment, a case will be described where the present disclosure is applied as a laser welding method that is implemented by a laser welding device used in a vehicle body manufacturing process.

Schematic Configuration of Laser Welding Device

Figure 1:
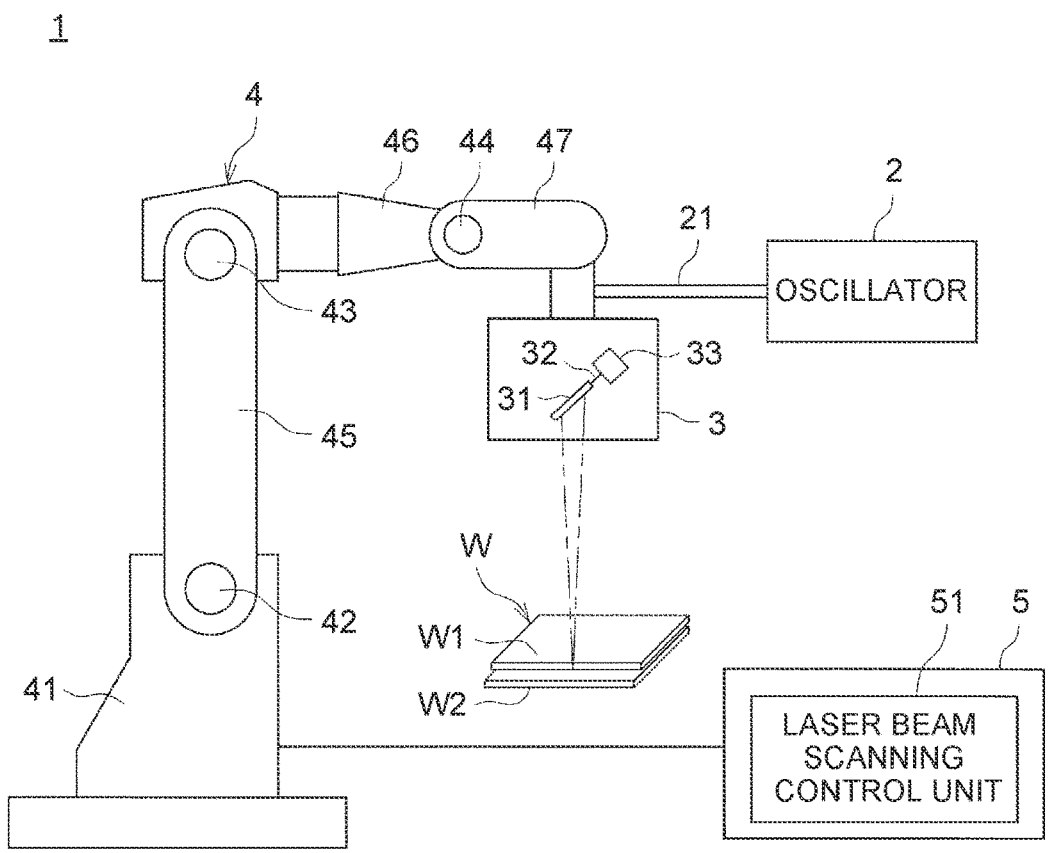
FIG. 1 is a schematic configuration view showing a laser welding device according to an embodiment.

FIG. 1 is a schematic configuration view showing a laser welding device 1 used for laser welding according to this embodiment. As shown in FIG. 1, the laser welding device 1 includes a laser oscillator 2, a laser scanner 3, a welding robot 4, and a robot controller 5.

The laser oscillator 2 generates a laser beam. The laser beam generated by the laser oscillator 2 is guided to the laser scanner 3 through an optical fiber cable 21. For example, a carbon dioxide gas laser, a YAG laser, or a fiber laser can be used as the laser beam The laser scanner 3 irradiates a workpiece W composed of two overlapping aluminum-alloy plate materials (aluminum-based-metal plates; hereinafter also referred to simply as metal plates) W1, W2 with the laser beam guided through the optical fiber cable 21 (see the long dashed-short dashed lines in FIG. 1). The laser scanner 3 houses a group of lenses (not shown) and a plurality of mirrors 31 (of which only one mirror 31 is shown in FIG. 1). The group of lenses includes a collimator lens that turns the laser beam into a parallel beam, a condenser lens that condenses the laser beam so as to focus at a processing point in the workpiece W (a predetermined laser irradiation position in the workpiece W), etc. Each mirror 31 is configured to be able to turn around a turning shaft 32. Specifically, the turning shaft 32 is coupled to a scanning motor 33, and as the scanning motor 33 operates, the turning shaft 32 is turned and thereby the mirror 31 is turned. The laser scanner 3 can scan the laser beam by turning the mirrors 31 and move the irradiation position of the laser beam within a predetermined range in the workpiece W. Thus, it is possible to move the irradiation position of the laser beam without moving the laser scanner 3 itself. For example, a galvano-mirror can be used as the mirror 31.

The welding robot 4 is configured to be able to move the laser scanner 3. The welding robot 4 is formed by an articulated robot. Specifically, the welding robot 4 in this embodiment includes a base 41, a rotation mechanism (not shown) housed inside the base 41, joints 42, 43, 44, and arms 45, 46, 47. The welding robot 4 can move the laser scanner 3 in an arbitrary direction by rotating the rotation mechanism and swinging the arms 45, 46, 47 around the joints 42, 43, 44.

Information for moving the laser scanner 3 toward a welding target area (information on turning angles and amounts of the joints 42, 43, 44, etc.) is stored in the robot controller 5 in advance by off-line teaching. When a vehicle body has been conveyed to a place on a vehicle body manufacturing line at which a welding process is performed, the welding robot 4 operates based on this information in accordance with a control signal from the robot controller 5. Thus, the laser scanner 3 is placed so as to face the welding target area and the laser beam is emitted from the laser scanner 3 toward the welding target area to sequentially perform laser welding.

The robot controller 5 includes a laser beam scanning control unit 51 that outputs a control signal for moving the laser irradiation position in the workpiece W. The laser beam scanning control unit 51 outputs a control signal to the scanning motor 33. As the scanning motor 33 operates in accordance with this control signal, the mirrors 31 turn around the turning shafts 32, so that the laser beam is scanned and the laser irradiation position in the workpiece W is moved. This movement of the laser irradiation position in the workpiece W will be described later.

Welding Method

Next, a welding method that is the feature of this embodiment will be described. In this embodiment, a case will be described where lap fillet welding is performed on the two metal plates W1, W2 overlapping each other in a vertical direction, and where a border (lap fillet portion) between the metal plates W1, W2 is irradiated from above with a laser beam emitted from the laser scanner 3. Therefore, the metal plate on the upper side and the metal plate on the lower side will be hereinafter referred to as an upper plate W1 and a lower plate W2, respectively.

Figure 2:
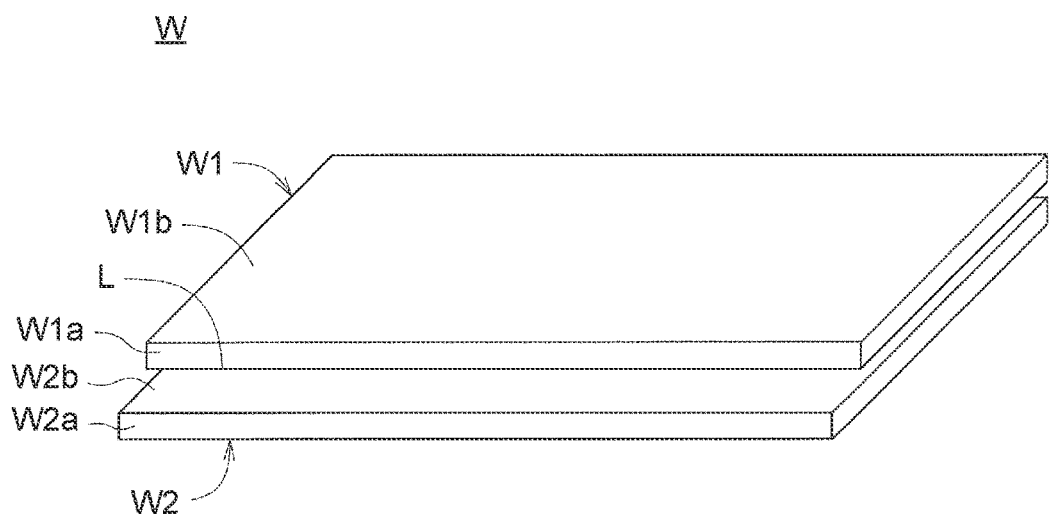
FIG. 2 is a perspective view showing a state of two metal plates overlapping each other.

FIG. 2 is a perspective view showing a state of the two metal plates W1, W2 overlapping each other. Lap fillet welding in this embodiment involves welding together the upper plate W1 and the lower plate W2 by melting metal material along a weld line L that is the border between the overlapping upper plate W1 and lower plate W2. Specifically, the position of a front end surface (the end surface on the near side in FIG. 2) W2a of the lower plate W2 is set to be slightly nearer than the position of a front end surface (the end surface on the near side in FIG. 2) W1a of the upper plate W1, and the laser beam is scanned (the condensing point of the laser beam is scanned) inside a joining region that is a predetermined range stretching from an upper surface W1b and the front end surface W1a of the upper plate W1 to an upper surface W2b of the lower plate W2, to thereby melt the metal material and weld together the upper plate W1 and the lower plate W2.

The welding process in this embodiment includes a partial welding step and a main welding step that is executed thereafter.

Figure 3:
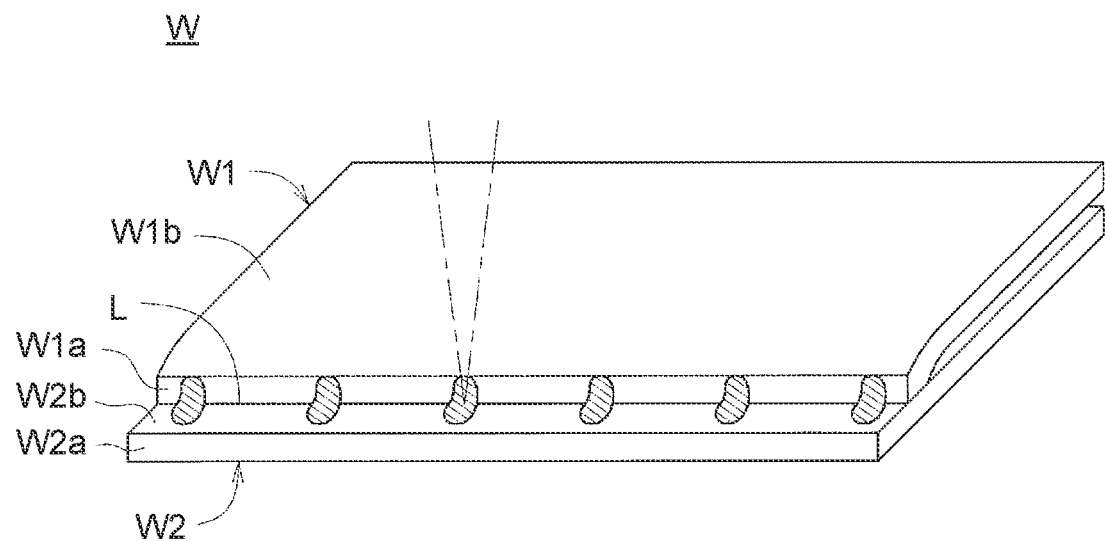
FIG. 3 is a view corresponding to FIG. 2, showing a state upon completion of a partial welding step.

The partial welding step is a step of partially joining together the metal plates W1, W2 by melting, under laser beam irradiation, at least one area (area stretching across the metal plates W1, W2) inside the joining region including the weld line L of the metal plates W1, W2. Specifically, as shown in FIG. 3 (a view corresponding to FIG. 2, showing a state upon completion of the partial welding step; the shaded portions represent welded areas that are formed as molten metal hardens), six areas located at predetermined intervals in the direction along the weld line L are separately irradiated with a laser beam to thereby melt these areas and partially join together the metal plates W1, W2.

The main welding step is a step performed upon completion of the partial welding step, after the metal melted in the partial welding step (molten metal) has hardened. In the main welding step, the entire joining region is sequentially irradiated with a laser beam to thereby melt the entire joining region and join together the metal plates W1, W2.

In the following, each of the partial welding step and the main welding step will be described.

Partial Welding Step

In the partial welding step, each of the areas (the six areas in FIG. 3) located at predetermined intervals in the direction along the weld line L in the metal plates W1, W2 is irradiated with a laser beam (see the long dashed-short dashed lines in FIG. 3), to thereby melt each area and partially join together the metal plates W1, W2.

Figure 4:
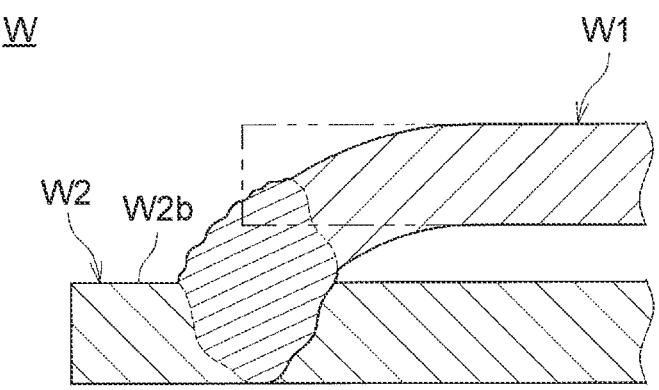
FIG. 4 is a sectional view of an area at which the metal plates have been partially welded together.

In the partial welding step, a gap between the metal plates W1, W2 (plate gap) becomes smaller as the molten metal contracts during solidification. Thus, the plate gap along the joining region becomes smaller. FIG. 4 is a sectional view of an area at which the metal plates W1, W2 have been partially welded together. FIG. 4 shows a state where a front end portion (the front end surface W1a and a surrounding portion) of the upper plate W1 and a portion of the upper surface W2b of the lower plate W2 facing the front end portion of the upper plate W1 have been melted under laser beam irradiation and then the front end portion of the upper plate W1 has curved toward the lower plate W2 as a result of contraction during solidification. As the front end portion of the upper plate W1 thus curves, the gap between the metal plates W1, W2 (the plate gap; the gap between a lower end of the front end surface W1a of the upper plate W1 and the upper surface W2b of the lower plate W2) becomes smaller. Thus, the plate gap along the joining region becomes smaller.

The inventors of the present disclosure found that parameters that influence the change in the plate gap between the metal plates W1, W2 occurring during execution of the partial welding step included the welding order, the number of welding points, the weld length, the welding time interval, and the plate thickness of the upper plate W1.

Here, the welding order is an order in which welding areas specified at positions located at predetermined intervals in the direction along the weld line L are welded. The number of welding points is the number of the welding areas specified at the positions located at predetermined intervals in the direction along the weld line L. The weld length is the length in the direction along the weld line L of a molten portion at each welding area. The welding time interval is an interval at which the welding areas are sequentially irradiated with a laser beam (the time interval from the completion of laser beam irradiation of one welding area until the start of laser beam irradiation of the next welding area).

The results of experiments conducted to obtain relations between these parameters and the plate gap between the metal plates W1, W2 remaining after the partial welding step will be described below. Laser welding conditions (the laser output power, the laser focus position, etc.) in the following experiments were appropriately set. Specifically, laser welding conditions under which the partial welding step could be completed within a predetermined time were preset within such a range that spattering could be suppressed.

Figure 5:
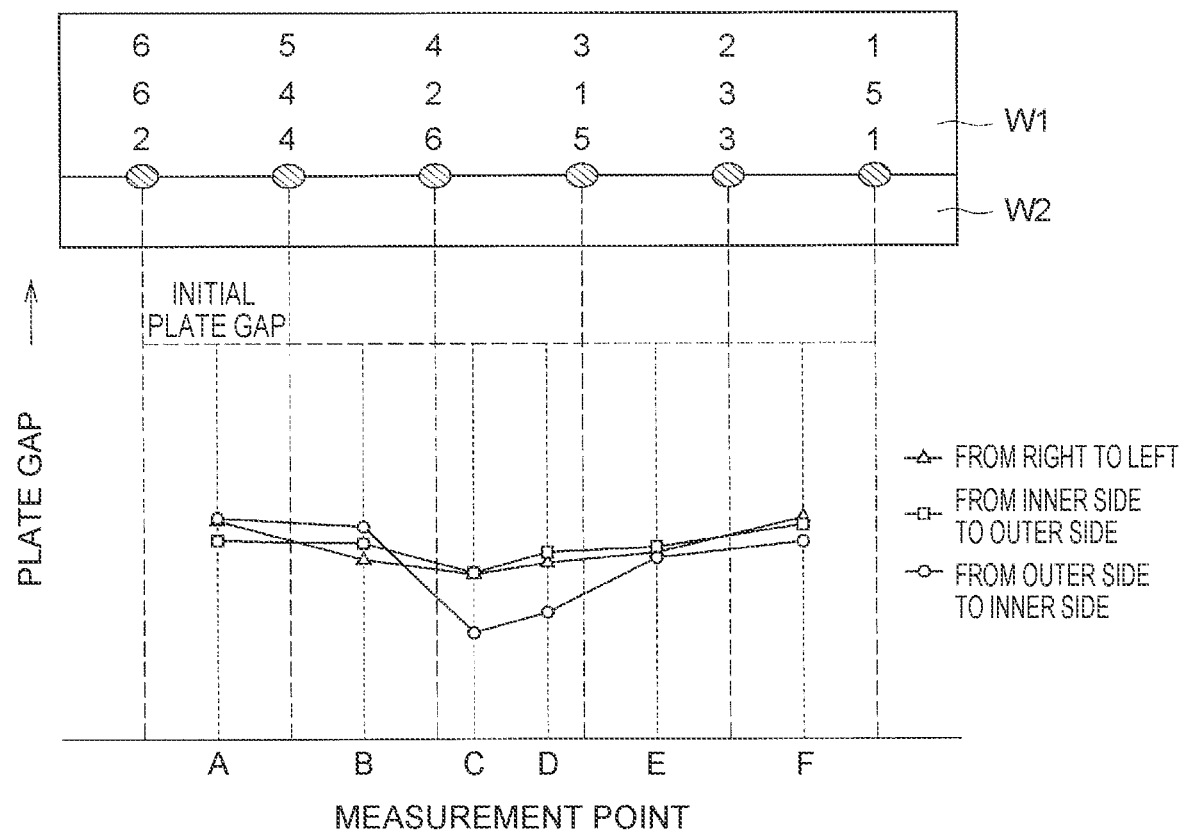
FIG. 5 is a graph showing a result of an experiment for obtaining a relation between a welding order in the partial welding step and a plate gap remaining after the partial welding step.

Relation Between Welding Order and Plate Gap Remaining After Partial Welding Step FIG. 5 is a graph showing the result of the experiment conducted to obtain the relation between the welding order in the partial welding step and the plate gap remaining after the partial welding step. The numbers on the metal plates W1, W2 shown on the upper side of FIG. 5 indicate the welding order of the (six) welding areas. Thus, this experiment was conducted using three types of welding orders. As a first welding order of these three types of welding orders, welding was performed at equal intervals sequentially from the right side toward the left side of FIG. 5. The result (the plate gap remaining after the partial welding step) in this case is represented by triangles on the lower side of FIG. 5. As a second welding order, welding was performed at equal intervals sequentially from the center side (inner side) toward the outer side of FIG. 5. The result in this case is represented by squares on the lower side of FIG. 5. As a third welding order, welding was performed at equal intervals sequentially from the outer side toward the center side (inner side) of FIG. 5. The result is represented by circles on the lower side of FIG. 5.

This experiment found that welding in the third welding order of the three types of welding orders, i.e., welding at equal intervals sequentially from the outer side toward the center side of FIG. 5, results in the smallest plate gap at a center portion (see measurement points C, D in FIG. 5). Specifically, the plate gaps at the measurement points C, D were reduced to about 40% of the initial plate gap (the plate gap before the partial welding step; e.g., 0.5 mm).

Thus, it is concluded that the optimal welding order in the partial welding step is the order in which welding is performed sequentially from the outer side toward the center side.

Figure 6:
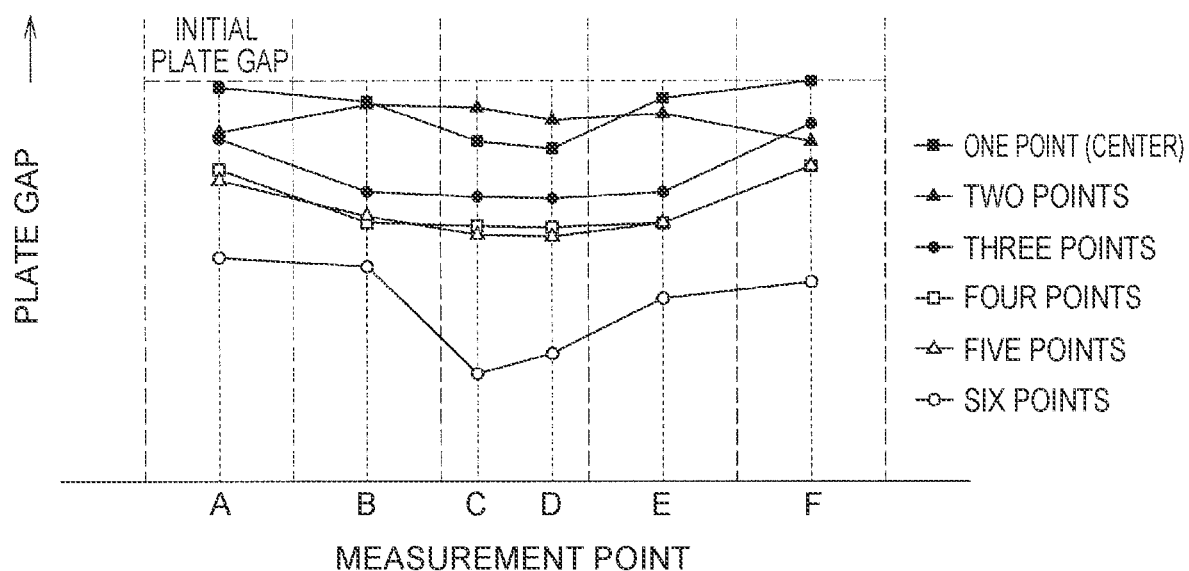
FIG. 6 is a graph showing a result of an experiment for obtaining a relation between the number of welding points in the partial welding step and the plate gap remaining after the partial welding step.

Relation Between Number of Welding Points and Plate Gap Remaining After Partial Welding Step FIG. 6 is a graph showing the result of the experiment conducted to obtain the relation between the number of welding points in the partial welding step and the plate gap remaining after the partial welding step. In this experiment, the plate gap remaining after the partial welding step was measured in each of cases where the number of welding points were respectively set to one, two, three, four, five, and six. In the case of one welding point, a roughly center portion in the direction along the weld line L was defined as the welding area. In the cases of more than one welding point, areas located at equal intervals in the direction along the weld line L were specified as the welding areas.

As shown in FIG. 6, it was found that the plate gap remaining after the partial welding step becomes smaller as the number of welding points increases. Also in this case, the plate gaps at the measurement points C, D were reduced to about 40% of the initial plate gap.

Thus, it is concluded that a larger number of welding points in the partial welding step is preferable from the viewpoint of reducing the plate gap remaining after the partial welding step. However, the plate gap reducing effect hardly varied when the number of welding points was set to seven (this case is not shown in FIG. 6). It is therefore concluded that the appropriate number of welding points is six in consideration of the time (takt time) taken for the partial welding step. In this experiment, the plate width (the dimension in the left-right direction in FIG. 2) of each of the metal plates W1, W2 was 60 mm. Accordingly, it is concluded that the appropriate interval between two adjacent welding areas is about 10 mm.

Relation Between Weld Length and Plate Gap Remaining After Partial Welding Step

Figure 7:
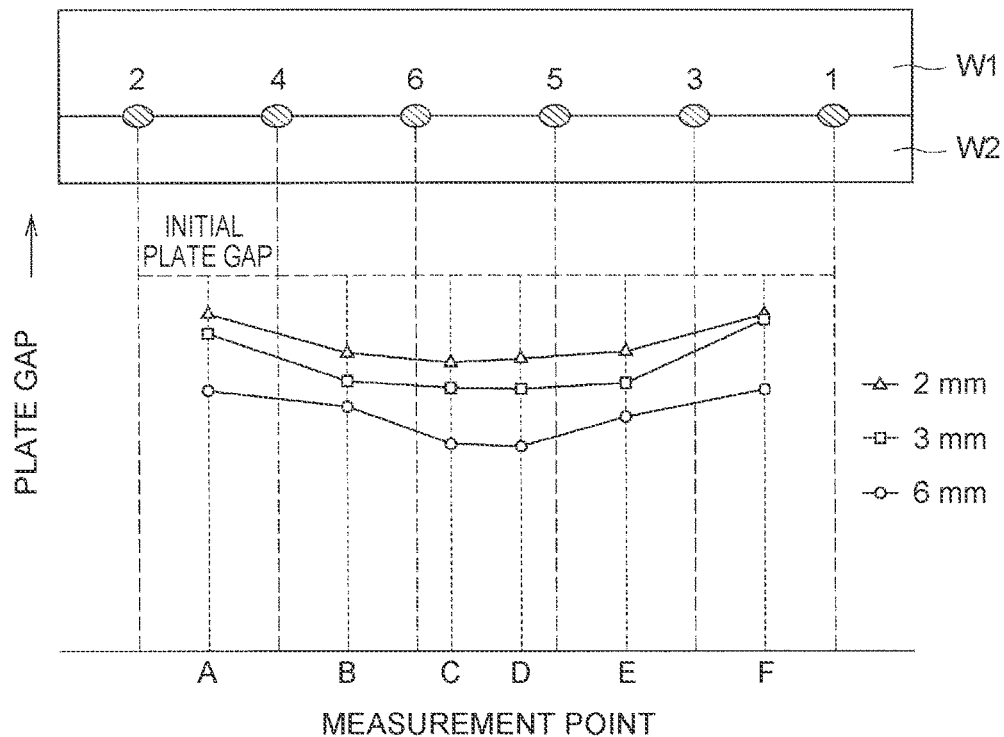
FIG. 7 is a graph showing a result of an experiment for obtaining a relation between a weld length in the partial welding step and the plate gap remaining after the partial welding step.

FIG. 7 is a graph showing the result of the experiment conducted to obtain the relation between the weld length in the partial welding step and the plate gap remaining after the partial welding step. In this experiment, the plate gap remaining after the partial welding step was measured in each of cases where the weld length was respectively set to 2 mm, 3 mm, and 6 mm. The welding order was the above-described order in which welding is performed at equal intervals sequentially from the outer side toward the center side (inner side).

As shown in FIG. 7, it was found that the plate gap remaining after the partial welding step becomes smaller as the weld length increases. In this case, the plate gaps at the measurement points C, D were reduced to about 50% of the initial plate gap.

Thus, it is concluded that a longer weld length in the partial welding step is preferable from the viewpoint of reducing the plate gap remaining after the partial welding step. However, when the weld length was set to 6 mm, portions of some welding areas failed to be welded. It is therefore concluded that the appropriate weld length is 3 mm as the largest possible weld length that can be secured within such a range that all the welding areas are reliably welded.

Figure 8:
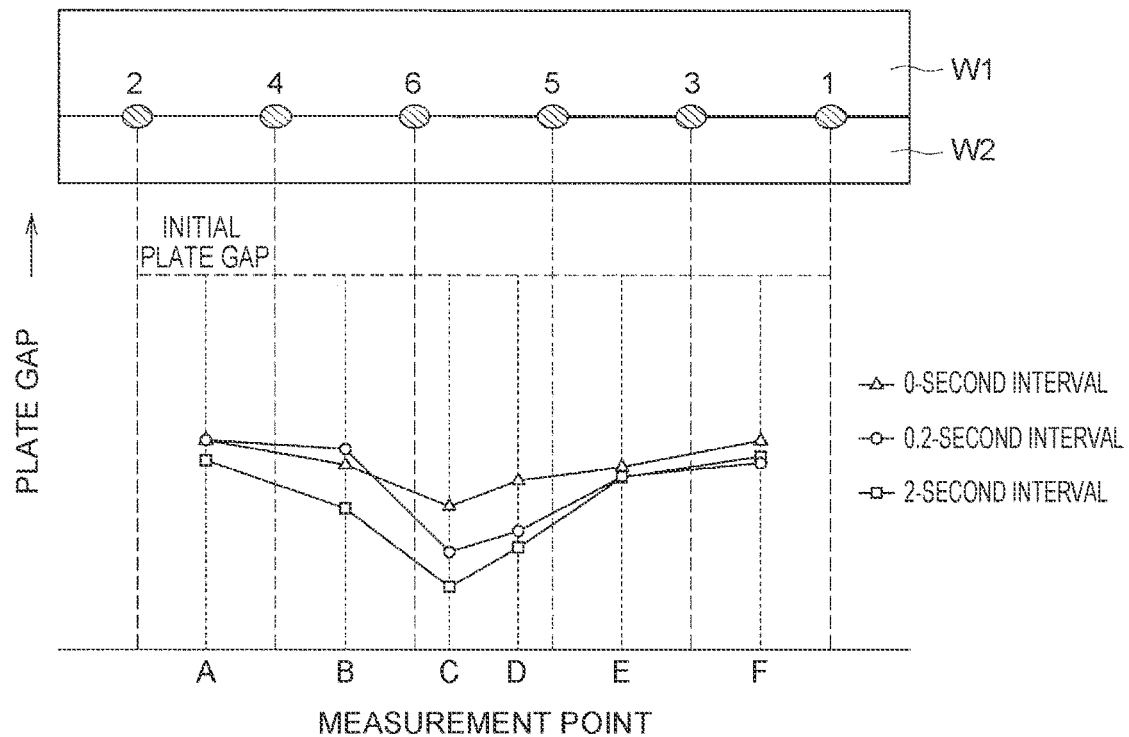
FIG. 8 is a graph showing a result of an experiment for obtaining a relation between a welding time interval in the partial welding step and the plate gap remaining after the partial welding step.
Figure 9:
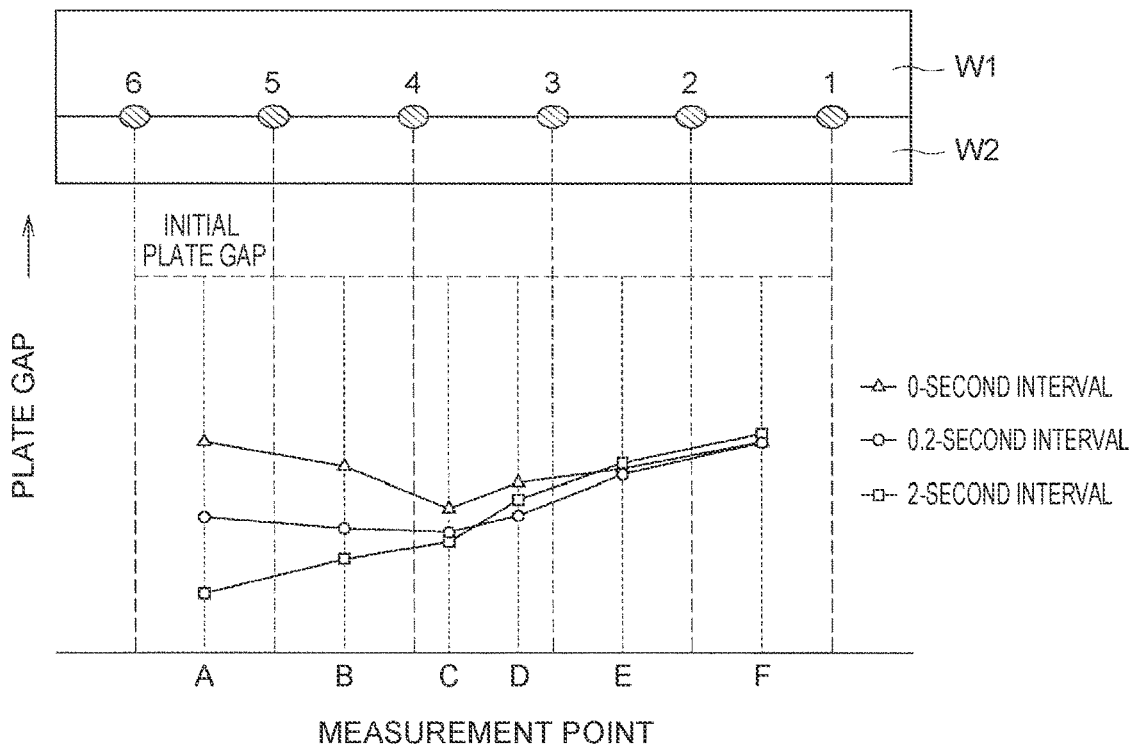
FIG. 9 is a graph showing an additional result of the experiment for obtaining the relation between the welding time interval in the partial welding step and the plate gap remaining after the partial welding step.

Relation Between Welding Time Interval and Plate Gap Remaining After Partial Welding Step FIG. 8 and FIG. 9 are graphs showing the results of the experiment conducted to obtain the relation between the welding time interval in the partial welding step and the plate gap remaining after the partial welding step. In this experiment, the plate gap remaining after the partial welding step was measured in each of cases where the welding time interval was respectively set to 0 second, 0.2 seconds, and 2 seconds. FIG. 8 shows the result of a case where the welding order was welding at equal intervals sequentially from the outer side toward the center side (inner side), and FIG. 9 shows the result of a case where the welding order was welding at equal intervals sequentially from the right side toward the left side of FIG. 9.

As shown in FIG. 8 and FIG. 9, it was found that the plate gap remaining after the partial welding step (the plate gap at the area where the plate gap is smallest) becomes smaller as the welding time interval increases. Thus, it is concluded that, although a longer welding time interval is preferable from the view point of reducing the plate gap remaining after the partial welding step, the appropriate welding time interval is 0.2 seconds, at which the plate gap can be sufficiently reduced, in consideration of the time (takt time) taken for the partial welding step.

Figure 10:
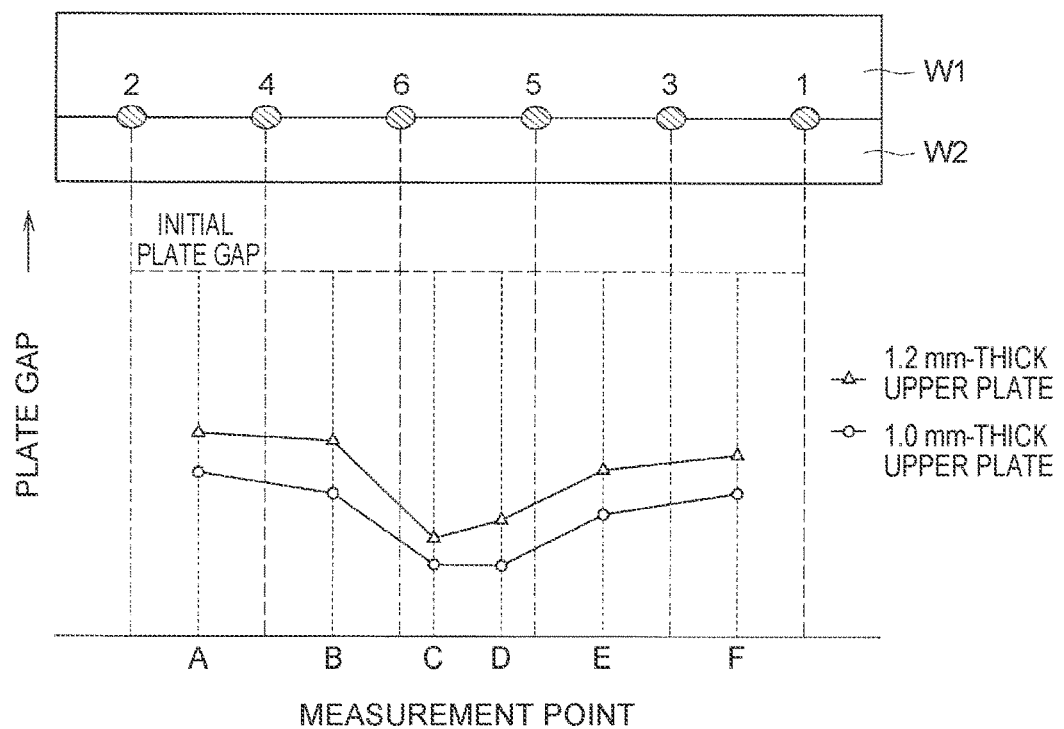
FIG. 10 is a graph showing a result of an experiment for obtaining a relation between a plate thickness of an upper plate in the partial welding step and the plate gap remaining after the partial welding step.

Relation Between Plate Thickness of Upper Plate and Plate Gap Remaining After Partial Welding Step FIG. 10 is a graph showing the result of the experiment conducted to obtain the relation between the plate thickness of the upper plate W1 in the partial welding step and the plate gap remaining after the partial welding step. In this experiment, the plate gap remaining after the partial welding step was measured in each of cases where the plate thickness of the upper plate W1 was respectively set to 1.2 mm and 1.0 mm. The welding order was the above-described order in which welding is performed at equal intervals sequentially from the outer side toward the center side (inner side).

As shown in FIG. 10, it was found that the plate gap remaining after the partial welding step was smaller when the plate thickness of the upper plate W1 was 1.0 mm than when the plate thickness thereof was 1.2 mm. In this case, the plate gaps at the measurement points C, D were reduced to about 30% of the initial plate gap.

Thus, it is concluded that a smaller plate thickness of the upper plate W1 is preferable from the viewpoint of reducing the plate gap remaining after the partial welding step.

As has been described above, the results of these experiments lead to the conclusion that the following conditions are preferable from the viewpoint of reducing the plate gap remaining after the partial welding step: that the welding order in the partial welding step is welding sequentially from the welding area located on the outer side to the welding area located on the inner side; that the number of welding points in the partial welding step is six; that the weld length in the partial welding step is approximately 3 mm; that the welding time interval in the partial welding step is approximately 0.2 seconds; and that the plate thickness of the upper plate W1 is as small as possible.

As described above, when the plate width of each of the metal plates W1, W2 is 60 mm, the optimal number of welding points in the partial welding step is six. Therefore, as the general idea of setting the number of welding points in the partial welding step, it is preferable that the number of welding points be set to such a number that, when areas located at equal intervals in the direction along the weld line L are specified as the welding areas, there is one area per 10 mm of the plate width of the metal plates W1, W2. Moreover, it is preferable that the plate thickness of the upper plate W1 be as small as possible within such a range of the plate thickness that the sufficient rigidity of the vehicle body can be secured. Thus, it is preferable to secure the rigidity of the vehicle body by setting the plate thickness of the lower plate W2 to be sufficiently large, while setting the plate thickness of the upper plate W1 to be small (smaller than the plate thickness of the lower plate W2).

Main Welding Step

Next, the main welding step will be described. As described above, the main welding step is a step performed upon completion of the partial welding step, after the metal melted in the partial welding step (molten metal) has hardened, and in the main welding step, the entire joining region is sequentially irradiated with a laser beam to thereby melt the entire joining region and join together the metal plates W1, W2.

Figure 11:
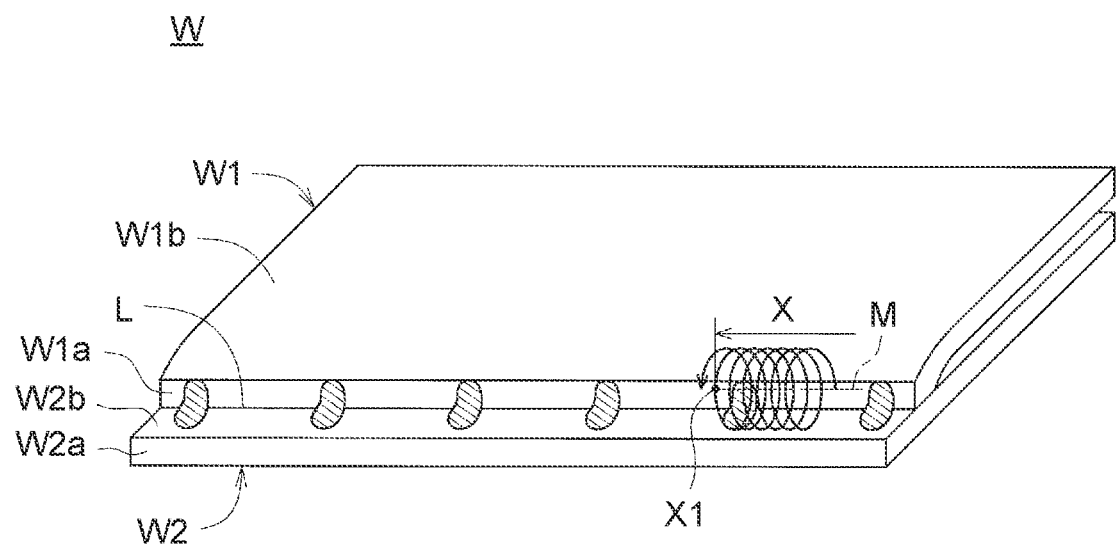
FIG. 11 is a view corresponding to FIG. 2, illustrating scanning of a laser beam in a main welding step.

As indicated by the solid arrow in FIG. 11 (the path of the irradiation position of the laser beam), the laser beam is scanned (the irradiation position of the laser beam in the upper plate W1 and the lower plate W2 is moved) in the main welding step in such a manner that the irradiation position of the laser beam is moved along a locus which elliptically circles around a locus center so as to cross the weld line L that is the border between the upper plate W1 and the lower plate W2 while the locus center is moved in the direction along the weld line L (the direction toward the left side in FIG. 11). In FIG. 11, a line connecting the centers of the paths is represented by the long dashed-short dashed line M, and the long dashed-short dashed line M is parallel to the weld line L. This type of welding technique is commonly called laser wobbling welding.

Specifically, the moving direction of the irradiation position of the laser beam is set such that the laser beam is first applied to the upper plate W1 and then to the lower plate W2 when the laser beam passes through an unmelted zone of the upper plate W1 and the lower plate W2 on a downstream (the left side in FIG. 11) of a range (the range X in FIG. 11) through which the laser beam has already passed in the direction along the weld line L(the unmelted zone is a zone that have not yet been irradiated with the laser beam and are regions located on the left side of the point X1 in FIG. 11). In other words, the laser beam is scanned so as to move along the locus which elliptically circles around the locus center in the counter-clockwise direction in FIG. 11, while the locus center moves toward the left side along the weld line L. As described above, the irradiation position of the laser beam is moved as the control signal from the laser beam scanning control unit 51 is output to the scanning motor 33 that turns the mirrors 31 and then the scanning motor 33 operates and turns the mirrors 31.

Figure 12:
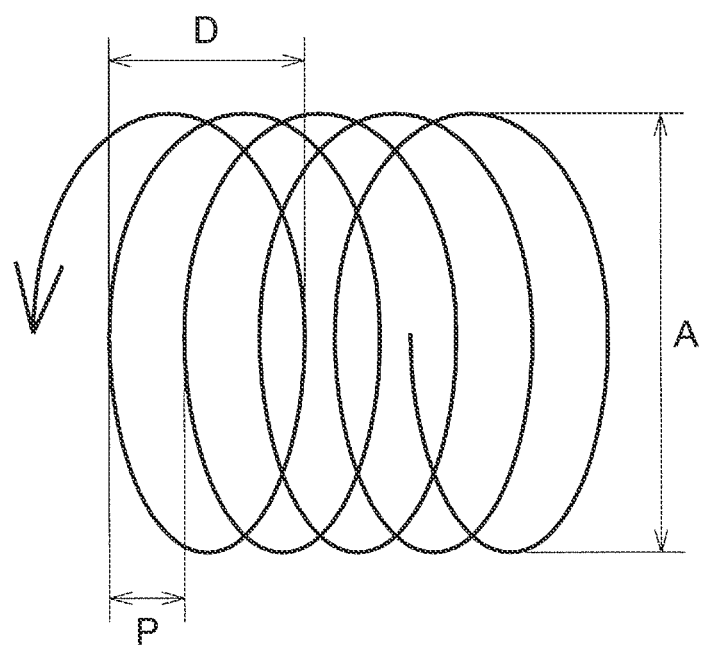
FIG. 12 is a view illustrating a path of an irradiation position of the laser beam in the main welding step.

The elliptical path of the irradiation position of the laser beam will be described in detail. For example, when the plate thickness of the upper plate W1 and the lower plate W2 is 1.0 mm to 1.5 mm, as shown in FIG. 12, a length (amplitude) A of the elliptical shape in a long-axis direction (the up-down direction in FIG. 12; the direction orthogonal to the weld line L) is set to a predetermined value within a range of 2.5 mm to 3.5 mm. A length (width) D of the elliptical shape in a short-axis direction (the left-right direction in FIG. 12; the direction parallel to the weld line L) is set to a predetermined value within a range of 1.0 mm to 2.5 mm. A pitch P in the direction along the weld line L (the amount of scanning movement in the direction along the weld line L per rotation with the center of the elliptical shape of the path (the locus center) being moved in the direction along the weld line L) is set to a predetermined value within a range of 0.8 mm to 1.5 mm. These values are not limited to the above examples but may be appropriately set based on an experiment or a simulation according to the plate thickness of the upper plate W1 and the lower plate W2, etc.

Laser beam conditions in the main welding step are as follows. The laser output power is set to a predetermined value within a range of 3000 W to 4000 W. The scanning speed along the elliptical path is set to a predetermined value within a range of 3000 cm/min to 4000 cm/min. These values are not limited to the above examples but may be appropriately set based on an experiment or a simulation according to the plate thickness of the upper plate W1 and the lower plate W2, etc.

Next, the melting state of metal material in the main welding step will be described. FIG. 13A to FIG. 13D are enlarged views of a welding area of the workpiece W, illustrating states of the movement of the irradiation position of the laser beam in the main welding step. The points S1 to S4 in FIG. 13A to FIG. 13D indicate the irradiation positions of the laser beam. Thus, it is shown that the irradiation position of the laser beam moves along the elliptical path, indicated by the long dashed-short dashed line, in the order of S1, S2, S3, and S4 as the state transitions from FIG. 13A to FIG. 13D.

As shown in FIG. 13, in the main welding step, lap fillet welding is performed on the border between the upper plate W1 and the lower plate W2 under laser beam irradiation, when the irradiation position of the laser beam is moved along the locus which elliptically circles around the locus center so as to cross the weld line L that is the border between the upper plate W1 and the lower plate W2 such that the locus center moves in the direction along the weld line L (the direction toward the left side in FIG. 13A to FIG. 13D), as described above. The irradiation position of the laser beam moves along the locus which elliptically circles around the locus center in the counter-clockwise direction in FIG. 13A to FIG. 13D, while the locus center moves toward the left side along the weld line L. In other words, the moving direction of the irradiation position of the laser beam which conforms to the locus is set such that that the laser beam is first applied to the upper plate W1 and then to the lower plate W2 when the laser beam passes through the unmelted zone of the upper plate W1 and the lower plate W2 on the downstream of the range X (see FIG. 11) through which the laser beam has already passed in the direction along the weld line L.

Figure 13A:
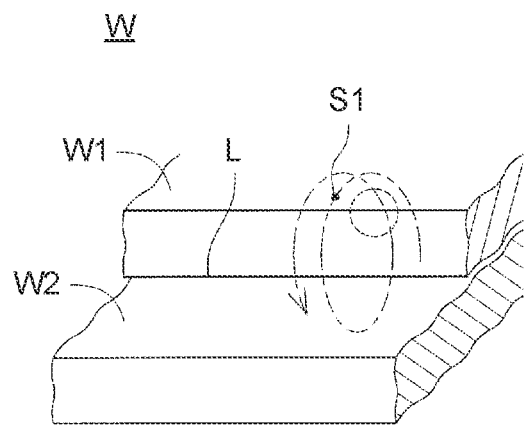
FIG. 13A is an enlarged view of a welding area of a workpiece, illustrating a state of the movement of the irradiation position of the laser beam in the main welding step.
Figure 13B:
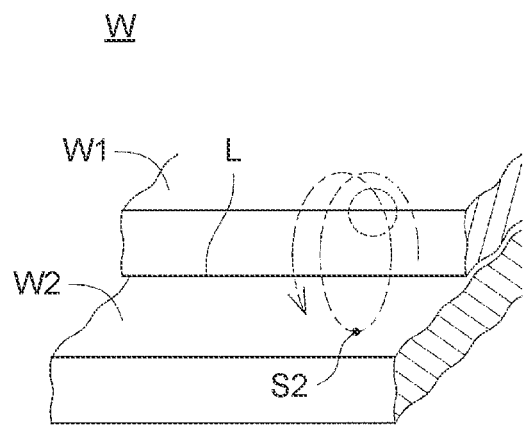
FIG. 13B is an enlarged view of the welding area of the workpiece, illustrating a state of the movement of the irradiation position of the laser beam in the main welding step.
Figure 13C:
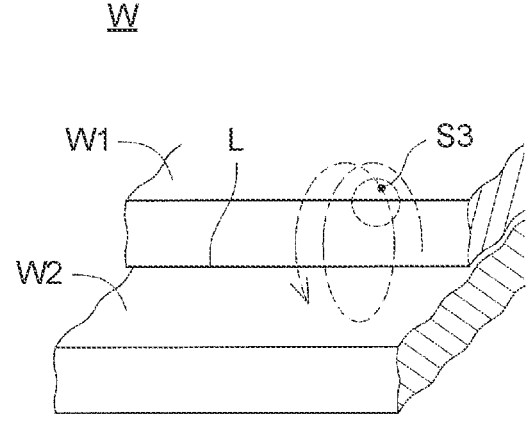
FIG. 13C is an enlarged view of the welding area of the workpiece, illustrating a state of the movement of the irradiation position of the laser beam in the main welding step.
Figure 13D:
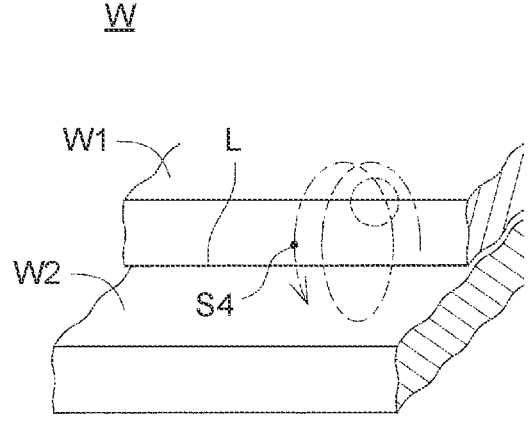
FIG. 13D is an enlarged view of the welding area of the workpiece, illustrating a state of the movement of the irradiation position of the laser beam in the main welding step.
Figure 14:
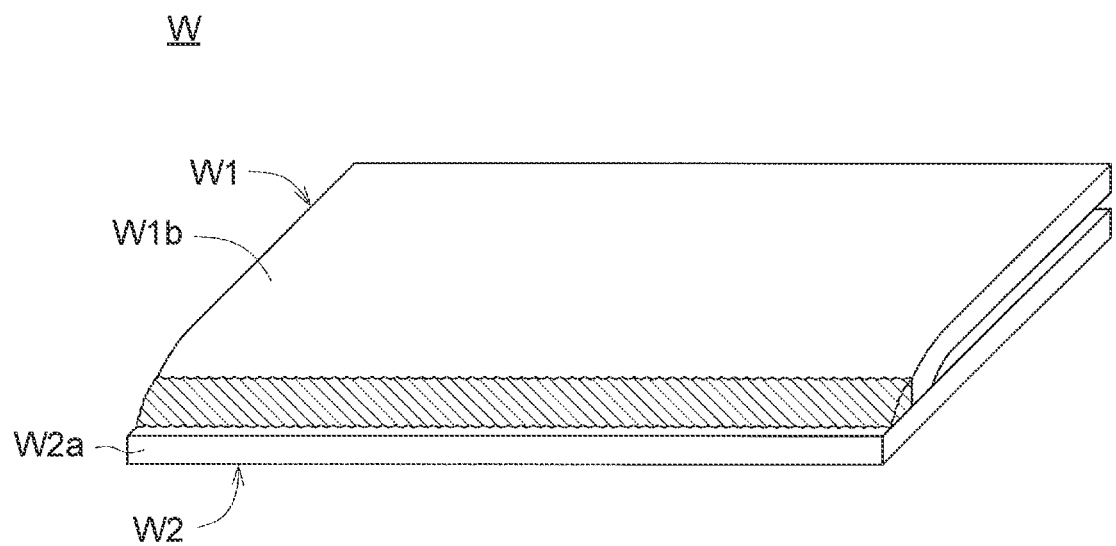
FIG. 14 is a view corresponding to FIG. 2, showing a state upon completion of the main welding step.

Thus, in the irradiation state (irradiation position S1) of the laser beam shown in FIG. 13A, the upper plate W1 is irradiated with the laser beam, so that the metal material of the upper plate W1 is melted at the irradiation position S1 to bridge the gap between the upper plate W1 and the lower plate W2. In this case, the heat of the laser beam is transferred not only to the upper plate W1 but also to the lower plate W2, so that a good weld is formed between the upper plate W1 and the lower plate W2 at this irradiation position of the laser beam. Since the heat of the laser beam is transferred to both the upper plate W1 and the lower plate W2, at this point, a region of the upper plate W1 around the irradiation position S1 of the laser beam (e.g., the region circled by the dashed line in FIG. 13A) has a relatively small amount of heat input and the metal material in this region is in a state of being not sufficiently melted (e.g., a half-melted state). Thereafter, the irradiation position S2 of the laser beam moving along the path passes through the lower plate W2 as indicated by the irradiation state (irradiation position S2) of the laser beam shown in FIG. 13B, and then the irradiation position S3 of the laser beam reaches the upper plate W1 again as indicated by the irradiation state (irradiation position S3) of the laser beam shown in FIG. 13C. As a result, the metal material in the aforementioned region of the upper plate W1 (the region around the position at which the upper plate W1 and the lower plate W2 have already been welded together; the region circled by the dashed line in FIG. 13C) that has not been sufficiently melted is fully melted under laser beam irradiation, so that a good weld is formed between the upper plate W1 and the lower plate W2 also at this irradiation position of the laser beam. When the irradiation state (irradiation position S4) of the laser beam shown in FIG. 13D is reached, the region circled by the dashed line in FIG. 13D solidifies, so that a good weld is formed between the upper plate W1 and the lower plate W2 in this region. As this series of actions is consecutively performed each time the irradiation position of the laser beam makes one revolution along the elliptical path, the metal material is melted along the weld line L and the upper plate W1 and the lower plate W2 are welded together. FIG. 14 is a view corresponding to FIG. 2, showing a state upon completion of the main welding step.

In the case of this embodiment, while the upper plate W1 is irradiated with a laser beam, the molten metal of the upper plate W1 flows easily into the melted portion of the lower plate W2 by the action of gravity, and thus the molten metal of the upper plate W1 and that of the lower plate W2 are mixed. Therefore, when the border between the upper plate W1 and the lower plate W2 is oriented along the vertical direction, the gap between the upper plate W1 and the lower plate W2 is bridged in a better manner through the effective use of the gravity, so that the thickness of the welded area is secured and the upper plate W1 and the lower plate W2 are welded together with even higher joining strength.

Thus, in the main welding step, when the irradiation position of the laser beam moving along the elliptical path reaches the upper plate W1 again, the laser beam at this irradiation position in the upper plate W1 melts a region that has not been sufficiently melted until then. This means that the laser beam is not emitted toward a region that has been fully melted. It is therefore possible to avoid a situation such as where the molten metal is blown away under the pressure of a keyhole as a laser beam is emitted toward a region that has been fully melted. Thus, a sufficient thickness of a welded region (a region where the metal material has melted and then solidified) (a sufficient throat thickness of a bead) can be secured, and thereby sufficient joining strength (joint strength) at the welded area can be secured.

Effects of Embodiment

As has been described above, in the partial welding step of this embodiment, at least one area inside the joining region of the metal plates W1, W2 is irradiated with a laser beam to thereby melt this area and partially join together the metal sheets W1, W2. Here, the gap between the metal plates W1, W2 (plate gap) becomes smaller as molten metal contracts during solidification. After a lapse of a predetermined time from completion of the partial welding step, the main welding step is performed. In the main welding step, the plate gap along the joining region has become smaller as a result of the partial welding step, so that even when the amount of molten metal in the main welding step is relatively small, this molten metal enters the plate gap to a degree sufficient to bridge the gap along the metal plates W1, W2, forming a good weld between the metal plates W1, W2. Since the plate gap along the joining region has thus become smaller before the start of the main welding step in this embodiment, it is easy to select the welding conditions for producing the amount of molten metal required to bridge the gap along the metal plates W1, W2 with molten metal. Thus, it is possible to avoid making the selection of welding conditions troublesome and allow for easy welding operation.

In this embodiment, the joining region extends in the direction along the weld line L that is the border between the metal plates W1, W2, and in the partial welding step, each of the areas located at predetermined intervals in the direction along the weld line L is melted to partially join together the metal plates W1, W2. As a result, upon completion of the partial welding step, the gap between the metal plates W1, W2 (plate gap) has become smaller along substantially the entire metal plates W1, W2 in the direction along the weld line L that is the border between the metal plates W1, W2. Thus, in the main welding step, the metal plates W1, W2 are welded together with an even amount of molten metal along substantially the entire joining region, so that even joining strength along substantially the entire joining region can be secured.

Modified Example 1

Next, Modified Example 1 will be described. This modified example is different from the embodiment in the welding areas and the welding order in the partial welding step. Therefore, only the welding areas and the welding order in the partial welding step will be described here.

Figure 15:
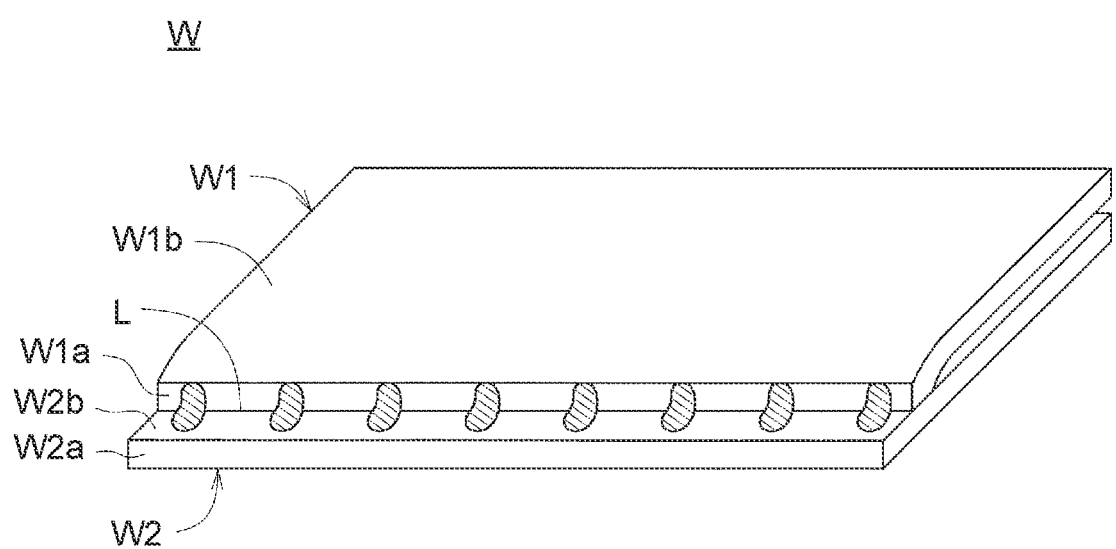
FIG. 15 is a view corresponding to FIG. 3, showing a state in Modified Example 1.
Figure 16:
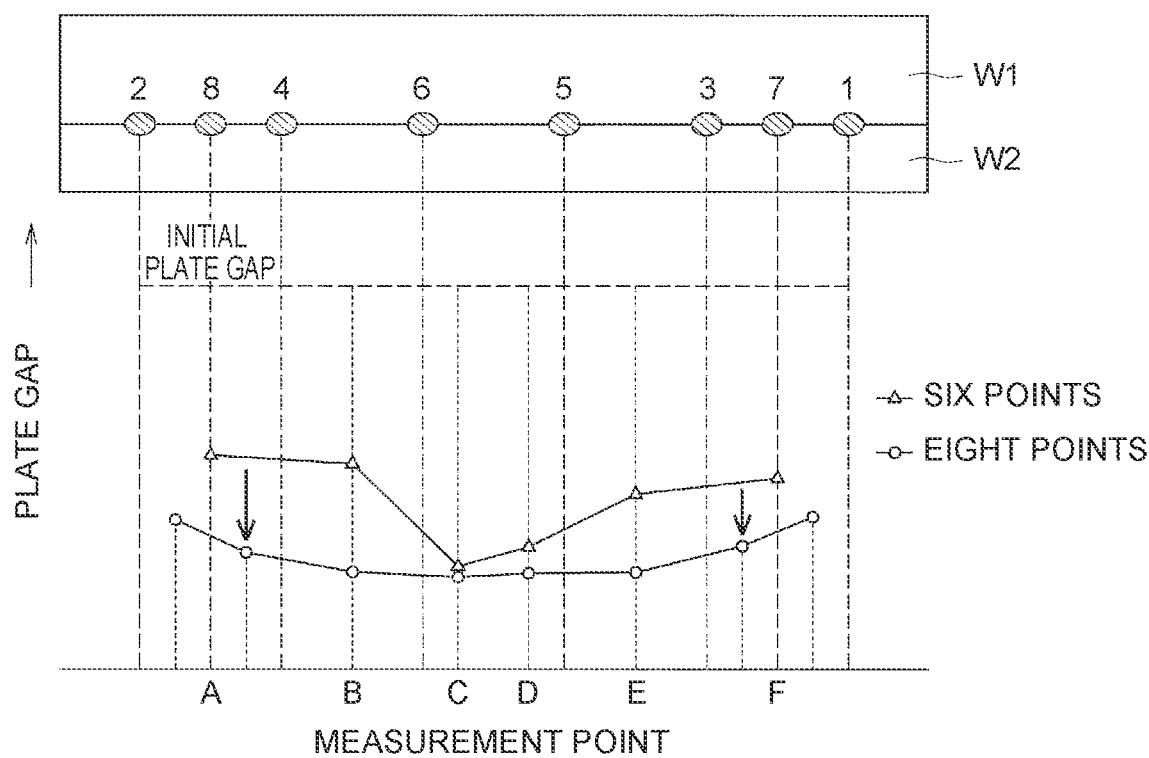
FIG. 16 is a graph corresponding to FIG. 6, showing a result in Modified Example 1.

FIG. 15 is a view corresponding to FIG. 3, showing a state in this modified example. FIG. 16 is a graph corresponding to FIG. 6, showing a result in this modified example. As shown in these drawings, welding in this modified example is performed as follows. A seventh welding area is set between a first welding area (the welding area located farthest on the right side in FIG. 16) and a third welding area, and an eighth welding area is set between a second welding area (the welding area located farthest on the left side in FIG. 16) and a fourth welding area. Welding is performed at equal intervals sequentially from the outer side toward the center side (inner side) of FIG. 16 (welding is performed at equal intervals sequentially from the first welding area to the sixth welding area), and then the seventh welding area is welded. After the seventh welding area is welded, the eighth welding area is welded.

Thus, the plate gap becomes smaller at the seventh welding area and the eighth welding area (measurement points F, A), and accordingly the plate gap becomes evenly smaller along the entire joining region of the metal plates W1, W2, than when welding is performed on six areas at equal intervals as in the above embodiment.

As a result, even when the amount of molten metal in the main welding step is even smaller than that in the above embodiment, this molten metal enters the plate gap to a degree sufficient to bridge the gap along the metal plates W1, W2, forming a good weld between the metal plates W1, W2.

To sufficiently produce the effect of this modified example, it is preferable that the molten metal have not fully hardened at each of the first welding area and the third welding area at the time of welding of the seventh welding area. Similarly, it is preferable that the molten metal have not fully hardened at each of the second welding area and the fourth welding area at the time of welding of the eighth welding area. In this modified example, the welding time interval is set with these conditions taken into account. For example, these conditions can be met by setting the welding time interval to 0.2 seconds as in the above embodiment.

Modified Example 2

Next, Modified Example 2 will be described. In this modified example, the present disclosure is applied to lap welding of a workpiece W composed of two overlapping metal plates (upper plate W1 and lower plate W2).

Figure 17A:
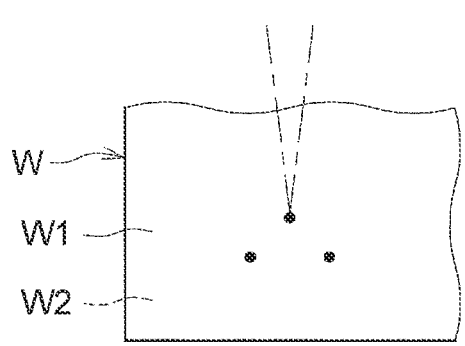
FIG. 17A is a plan view of a metal plate, showing welding areas in Modified Example 2.
Figure 17B:
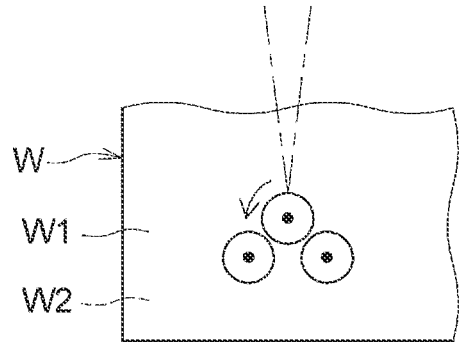
FIG. 17B is a plan view of the metal plate, showing the welding areas in Modified Example 2.

FIG. 17A and FIG. 17B are plan views of the workpiece W (upper plate W1 and lower plate W2), showing welding areas in this modified example. In the welding process of this modified example, the partial welding step is first performed, in which, as shown in FIG. 17A, three areas located close to one another are set as welding areas, and these areas are separately irradiated with a laser beam (see the long dashed-short dashed lines in FIG. 17A) to thereby partially weld together the metal plates. For example, a laser screw welding (LSW) method can be used here as the laser welding method. Specifically, a laser beam is scanned along the entire circumference around a center position of each welding area in the workpiece W to thereby melt the welding area and weld together the metal plates W1, W2. Also in this case, as with the above embodiment, the gap between the metal plates W1, W2 (plate gap) becomes smaller as the molten metal contracts during solidification. Thus, the plate gap along the joining region becomes smaller.

Thereafter, in the main welding step, as shown in FIG. 17B, a region surrounding a periphery of the welding area in the partial welding step is irradiated with a laser beam (see the long dashed-short dashed line in FIG. 17B) to thereby weld each joining region. In the main welding step, the plate gap in the joining region has become smaller as a result of the partial welding step, so that even when the amount of molten metal is relatively small, this molten metal enters the plate gap to a degree sufficient to bridge the gap along the metal plates W1, W2, forming a good joint between the metal plates W1, W2.

Modified Example 3

Next, Modified Example 3 will be described. Also in this modified example, the present disclosure is applied to lap welding of a workpiece W composed of two overlapping metal plates (upper plate W1 and lower plate W2).

Figure 18A:
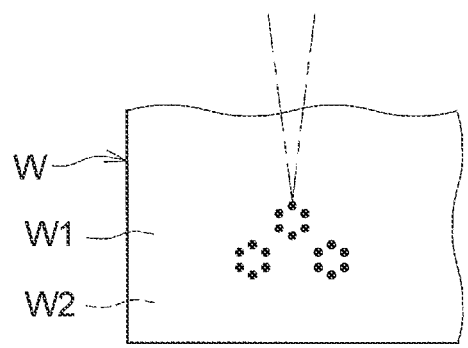
FIG. 18A is a plan view of a metal plate, showing welding areas in Modified Example 3.
Figure 18B:
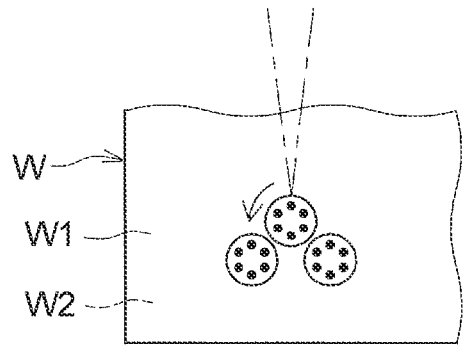
FIG. 18B is a plan view of the metal plate, showing the welding areas in Modified Example 3.

FIG. 18A and FIG. 18B are plan views of the workpiece W (upper plate W1 and lower plate W2), showing welding areas in this modified example. In the welding process of this modified example, the partial welding step is first performed, in which, as shown in FIG. 18A, six welding areas are set as one weld group, and this weld group is formed at three areas. For example, a laser screw welding (LSW) method can be used also here as the laser welding method. Also in this case, as with the above embodiment, the gap between the metal plates W1, W2 (plate gap) becomes smaller as the molten metal contracts during solidification. Thus, the plate gap at regions forming the weld groups becomes smaller.

Thereafter, in the main welding step, as shown in FIG. 18B, a region surrounding a periphery of each weld group formed in the partial welding step is irradiated with a laser beam to thereby weld the region forming the weld group. In the main welding step, the plate gap at each weld group has become smaller as a result of the partial welding step, so that even when the amount of molten metal is relatively small, this molten metal enters the plate gap to a degree sufficient to bridge the gap along the metal plates W1, W2, forming a good joint between the metal plates W1, W2.

Other Embodiments

The present disclosure is not limited to the above embodiment and modified examples, and any modifications and applications included in the scope of the claims and a scope equivalent to the scope of the claims are possible.

For example, in the above embodiment and modified examples, the case has been described where the present disclosure is applied as the laser welding method that is implemented by the laser welding device 1 used in a vehicle body manufacturing process. However, the present disclosure is also applicable to laser welding of other members. The present disclosure can be realized also as a method of arc welding instead of laser welding.

In the above embodiment, the case has been described where lap fillet welding is performed on the upper plate W1 and the lower plate W2 that are two aluminum-based-metal plates, with the irradiation position of a laser beam being moved along the elliptical path in the main welding step. The present disclosure is not limited to this example, and lap fillet welding may be performed with the irradiation position of the laser beam being moved along a circular (perfectly circular) path. The present disclosure is also applicable to lap fillet welding of three metal plates. In this case, the irradiation position of the laser beam is moved along a circular or elliptical path so as to cross the three metal plates. The present disclosure is also applicable to lap fillet welding of steel plates. In addition, the present disclosure is also applicable to lap fillet welding of metal sheets overlapping each other in a horizontal direction or another direction.

The present disclosure is applicable to a laser welding method of performing lap fillet welding on aluminum-based-metal plates by a laser beam.

What is claimed is:

1. A welding method of welding together a plurality of overlapping metal plates along a preset joining region, wherein the plurality of overlapping metal plates includes an upper plate and a lower plate, the welding method comprising:

performing partial welding of partially joining together the metal plates by melting at least one area inside the joining region of the metal plates, by using a laser beam irradiated from above the upper plate, wherein a position of a front end surface of the lower plate protrudes from a position of a front end surface of the upper plate, and wherein the at least one area inside the joining region is located along a weld line where the front end surface of the upper plate overlaps an upper surface of the lower plate; and after a lapse of a predetermined time from completion of the partial welding, performing main welding of joining together the metal plates by melting the joining region entirely.

2. The welding method according to claim 1, wherein:

the joining region extends in a direction along the weld line that is a border between the upper plate and the lower plate; and in the partial welding, each of a plurality of welding areas located at predetermined intervals in the direction along the weld line is melted to partially join together the upper plate and the lower plate.

3. The welding method according to claim 2, wherein, in the partial welding, the welding areas located on the weld line are welded sequentially from a welding area located on an outer side to a welding area located on an inner side, so that the partial welding is carried out in a direction from the outer side of the weld line toward a center of the weld line.

4. The welding method according to claim 2, wherein a number of the welding areas in the partial welding is set to such a number that, when areas located at equal intervals in the direction along the weld line are specified as the welding areas, an interval between two adjacent welding areas is 10 mm in the direction along the weld line.

5. The welding method according to claim 2, wherein a weld length at each of the welding areas in the partial welding is set to 3 mm in the direction along the weld line.

6. The welding method according to claim 2, wherein a welding time interval that is time interval from a completion of laser beam irradiation of one welding area until a start of laser beam irradiation of a next welding area in the partial welding is set to 0.2 seconds.

7. The welding method according to claim 2, wherein:

the upper plate and the lower plate overlap each other in a vertical direction; and a plate thickness of the upper plate is set to be smaller than a plate thickness of the lower plate.

8. The welding method according to claim 1, wherein:

the upper plate and the lower plate overlap each other in a vertical direction;

in the main welding, when a lap fillet portion of the upper plate and the lower plate is welded under irradiation of the laser beam from above, an irradiation position of the laser beam is moved along a locus which circularly or elliptically circles around a locus center so as to cross the weld line that is a border between the metal plates such that the locus center is moved in a direction along the weld line; and a moving direction of the irradiation position of the laser beam which conforms to the locus is set such that the laser beam is first applied to the upper plate and then to the lower plate when the laser beam passes through an unmelted zone of the upper plate and the lower plate, the unmelted zone being located on a downstream of a range through which the laser beam has already passed in the direction along the weld line.

9. The welding method according to claim 2, wherein, in the partial welding, the welding areas located on the weld line are welded sequentially from a welding area located on an outer side to a welding area located on an inner side, and then a portion between a welding area located farthest on the outer side and a welding area located adjacent to the welding area located farthest on the outer side is welded.

* * * * *